Patented Oct. 19, 1954

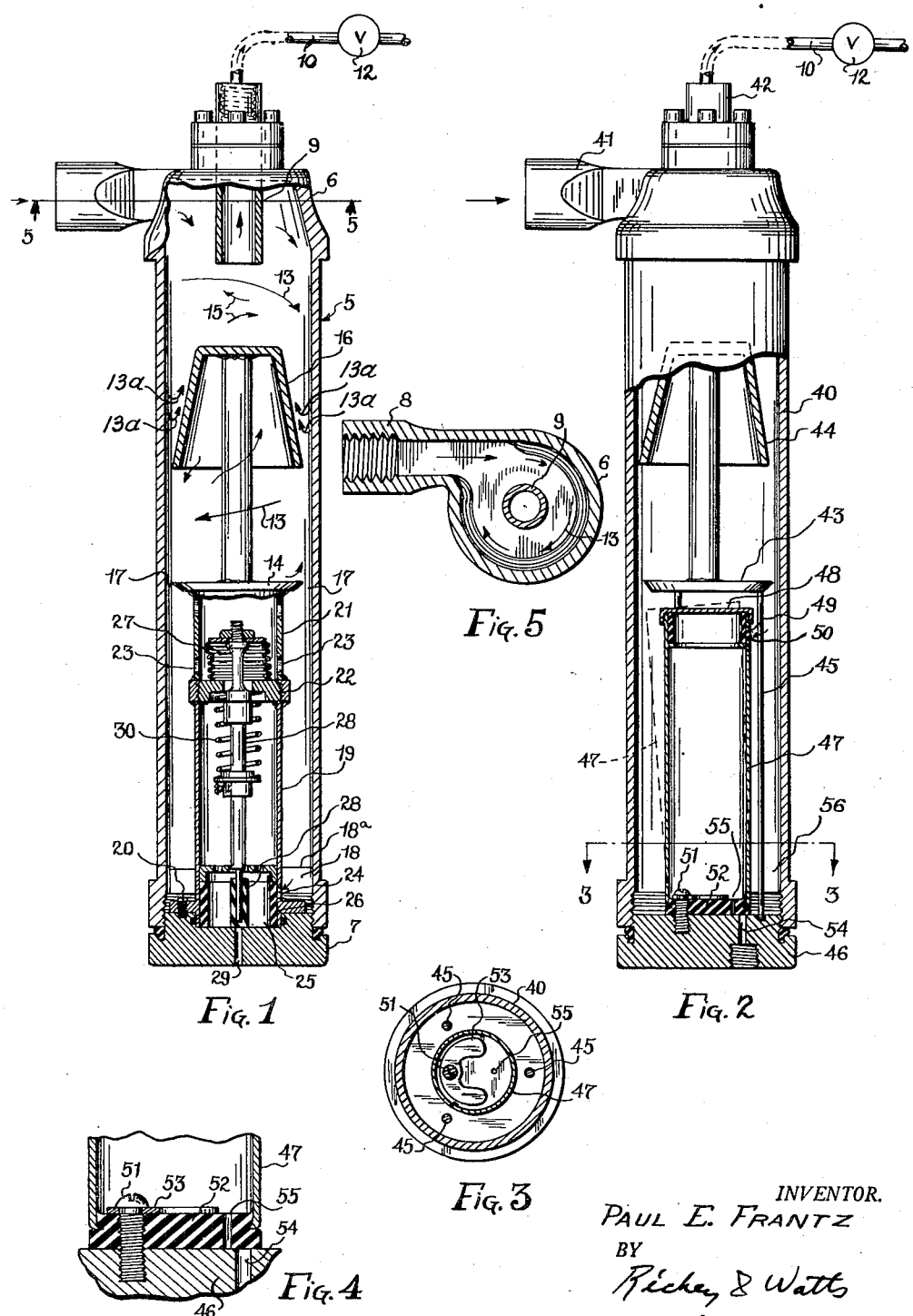

2,692,026

UNITED STATES PATENT OFFICE 2,692,026

SELF-UNLOADING CENTRIFUGAL SEPARATOR

Paul E. Frantz, Encino, Calif., assignor to Apex Electrical Mfg. Company, Cleveland, Ohio, a corporation of Ohio Application November 13, 1950, Serial No. 195,207

8 Claims. (Cl. 183—42)

This invention relates to a separator and more particularly to a separator of the centrifugal type having a self-unloading means which discharges separated material from the separator in response to pressure variations in the separator.

Numerous efforts have been made to provide a separator which may be installed in fluid pressure line for air, steam or the like which will separate from the gas moving through the separator foreign material such as water, oil, scale, and dirt particles. The term "gas" as used herein means a fluid having no free surfaces. Separators according to the prior art proposals have included centrifugal separators wherein the foreign material is separated from the gas moving through the separator and by a vortex action and wherein such foreign material was collected in a hopper or the like. In such prior art separators, it has been proposed that the hoppers which collect the foreign material be periodically emptied or unloaded by manually opening the bottom of the hopper. It has also been proposed, according to the prior art devices, to provide unloading devices in the nature of time controlled motors which are intended to empty the separated materials at predetermined intervals from the separator. It has been observed from the use of the prior art devices that those separators requiring manual attention for unloading are frequently neglected with the result that separated materials accumulate and are returned into the air line by the separator. It has also been observed that in those separators provided with time controlled unloading devices, the operating mechanism is such that the unloading devices may remain in open position and thus exhaust the gas from the line through the unloading device.

The prior art separators for gas lines also include devices wherein filter plates, wire screens, fabric and porous materials are used in an attempt to strain out from the gas stream particles of dust, oil and water. Such separators offer resistance to gas flow which resistance increases as foreign materials build up on the filtering surface. Due to the decreasing efficiency of the filters in use and the tendency for foreign particles to break free from the filter and re-enter the gas stream, the filter type of separator has been avoided for critical installations such as paint spray lines and the like.

According to the present invention, the separator requires no manual service on the part of the user and is so constructed and arranged that the unloading operation does not adversely affect the transmission of fluid pressure through the line.

It is among the objects of my invention to provide a separator generally circular in cross section and having a tangential inlet, an axial outlet adjacent the inlet, a baffle arranged with respect to the inlet and outlet to provide cyclone separation and an unloading device beneath the baffle which is actuated in response to pressure variations in the separating chamber.

It is a further object of my invention to provide a centrifugal separator according to the preceding object having therein an unloading chamber which is actuated in response to pressure changes in a separating chamber surrounding the unloading chamber, and wherein a port open to atmosphere is intermittently opened and closed by the actuation of the unloading chamber.

It is a further object of my invention to provide a separator having a casing for centrifugal separation, a discharge chamber within the casing, said discharge chamber constructed to admit fluid flow from the separating chamber into the discharge chamber and to prevent flow from the discharge chamber into the separating chamber and including means moving in response to pressure changes in the separating chamber to open and close a discharge port leading to the atmosphere.

It is a further object of my invention to provide a centrifugal separator having a baffle in the form of a truncated cone whereby the outer cyclone is turned inwardly and upwardly toward the inner cyclone so that the inside angle at the turn is less than 90 degrees.

Further objects and advantages will appear from the following description and the appended drawings wherein:

Fig. 1 is an elevation with parts in section of a separator made according to my invention;

Fig. 2 is an elevation with parts in section of a modified form of my separator;

Fig. 3 is a sectional view taken on the line 3—3 of Fig. 2;

Fig. 4 is an enlarged sectional view showing details of a portion of the device of Fig. 2; and Fig. 5 is a sectional view taken on the plane indicated 5—5 of Fig. 1.

Referring to the drawings, the separator which is indicated in its entirety as at 5 comprises an elongated cylindrical casing having a tapered inlet section 6 at its upper end and being closed by a threaded plug 7 at its lower end. The portion 6 includes a tangential inlet 8 and an outlet 9. In use, it will be understood that the inlet 8 is to be connected to a source of fluid pressure such as for instance a compressor and tank not shown and that the outlet 9 which is threaded at its upper end is to be connected to an outlet line 10 leading to valve 12 which may be opened and closed depending upon the requirements of the air line. The tangential arrangement of the inlet 8 in the tapered end portion 6 imparts a downward swirling motion to the air so that particles of scale, dirt, water and oil carried by the air are thrown centrifugally against the inner cylindrical wall of the casing 5. The downward spiral of this air travel is indicated by arrows 13. A horizontal baffle 14 is supported in the casing 5 above the bottom which cooperates with the inlet so as to turn the downward spiral and effect an upward spiral or cyclone within the outer cyclone, said upward spiral leading to the outlet tube 9 as indicated by the arrows 15. A conical baffle 16 is supported above the horizontal baffle 14 which causes a reversal or change of direction on the innermost cyclone as it travels upwardly toward the outlet. The sharp turning of the upward spiral about the lower edges of the conical baffle 16 tends to throw particles outwardly from the inner cyclone and into the downwardly moving outer cyclone.

Foreign particles such as scale, oil, and water separated from the air fall by gravity through the annular space 17 between the edge of the horizontal baffle and the inner wall of the casing into the lower portion of the casing as at 18. The support for the horizontal baffle 14 comprises a cylindrical casing 19 which is secured as at 20 to the end plug 7, and a bellows chamber or casing 21 mounted on the upper end wall 22 of the casing 19. The bellows chamber 21 is provided with openings 23 opening into the separator chamber. The casing 19 is provided with an opening 24 leading from the lower end of the separator chamber into the discharge chamber 25. A flexible ring such as 26 is arranged within the discharge chamber 25 so as to normally close the opening 24 somewhat in the fashion of a check valve. The ring 26 may be made of rubber, neoprene or the like so that it may flex inwardly in response to a fluid pressure in the separating chamber which exceeds the pressure within the discharge chamber 25, and that when pressure in the discharge chamber 25 exceeds the pressure in the separator, it will close the port 24 like a check valve. A sylphon bellows 27 is secured to the upper surface of the wall 22 of the casing 19 and a discharge valve rod 28 is anchored to the end wall of the sylphon bellows 27. The valve rod 28 extends downwardly from the sylphon bellows through an opening in the member 22 and has at its lower end a sealing member 28 arranged to open and close the discharge port 29 through the plug 7. A spring 30 surrounds the upper portion of the valve rod 28 and is arranged to urge the valve rod 28 downwardly into the sealing position when the pressure in chamber 19 and in the surrounding separating chamber are equalized.

In the operation of that form of my separator shown in Fig. 1, it will be noted that with the valve 12 closed, the interior of the separator's casing 5 will be subjected to line pressure. This pressure is effective through the port 24 to equalize the pressure in the discharge chamber formed by casing 19. For example, with the valve 12 closed, the line pressure, the pressure in the separating chamber and the pressure within the discharge chamber may be equalized at 90 pounds. When the valve 12 is opened, there is a momentary drop in pressure in the separating chamber such as, for instance, 2 pounds. The magnitude of this drop depends upon the extent of the opening in valve 12. Since the check valve arrangement at opening 25 prevents the air within the discharge chamber 19 from returning to the separating chamber, that is prevents the movement of air from the high pressure (for example 90 pounds), in the discharge chamber to the lower pressure (for example 88 pounds) in the separating chamber, the higher pressure is effective to expand the sylphon bellows 27. The bellows movement thus accomplished by the momentary drop in the separating chamber raises the sealing member 28 and exhausts therefrom until the pressure in the discharge chamber reaches a lower pressure (for example about 89½ pounds) so that the spring 30 will return the sealing member 28 to a closed position. This opening and closing action effected by the discharge chamber and bellows 27 is related to the balance between the spring 30 which is working against the spring of the bellows itself, the effective area of the bellows, the weight of the valve rod 28 and the pressure differential acting on the bellows.

As the valve 12 continues to remain in its open position, the air will swirl through the centrifugal separator as indicated by arrows 13 and 15, the arrows 13 indicating the outer cyclone and the arrows 15 indicating the inner cyclone leading to the outlet of the separator.

As indicated by the arrows 13A the greater portion of the air moving through the separator executes a sharp turn from the outer cyclone in towards the inner cyclone 15. The flat top on the conical baffle 16 facilitates the formation of the inner vortex and as the air moves from the outer cyclone or vortex to the inner vortex it is required to make a sharp change in direction where the large diameter of the conical baffle approaches the inner wall of the separator. The inside angle at the turn is less than 90 degrees and preferably is less than 45 degrees. It will be understood that in the outer vortex the foreign particles carried by the air stream have a considerable downward component and as they reach the area indicated by arrow above the flat baffle 14 the momentum of such particles carries them downwardly into the gap between the lower periphery of the conical baffle and the separator wall. The horizontal baffle 14 tends to further separate the foreign material from the air which is characterized by a turning movement but the helix in this lower section of the separator is much flatter than the helix above the conical separator. Beneath the baffle 14 the air appears to be traveling in an approximately horizontal path so that there is little or no tendency for particles carried beneath the baffle 14 to move upwardly within the chamber.

During the time that the valve 12 is open the foreign particles including oil and water will accumulate in the area indicated at 18 so that upon the closing of the valve 12 such accumulated material will be carried through the port 24 into the discharge chamber. This movement is occasioned by the higher pressure (such as 90 pounds) effective in the separating chamber with respect to the lower pressure (such as 88 or 89) in the discharge chamber. Thus, each time the valve is closed following a cycle of air movement through the separator, accumulated foreign materials are forced through the port 24 into the discharge chamber and such action continues until the pressure within the discharge chamber corresponds substantially to the pressure in the separating chamber at which time a resilient ring 26 is effective to close the port 24.

Upon a subsequent opening of the valve 12, the momentary pressure drop in the separating chamber as above described raises the sealing member 28 from the opening 29 and the foreign materials carried in the lower end of the discharge chamber are carried outwardly into the atmosphere by reason of the higher pressure in the discharge chamber. The relief of the pressure within the casing 19 effected by opening the port 29 is of momentary character and as soon as it is balanced by the pressure on the sylphon bellows 27 and by the spring 30 the sealing member 28 moves downwardly and closes the port 29. The cycle of operations above described continues throughout the intermittent opening and closing of the valve 12 and the frequency of the discharge of foreign materials from the separator depends upon the frequency of opening and closing the valve 12.

In that form of my invention illustrated in Fig. 2, the casing 40, the inlet 41 and outlet 42, the horizontal baffle 43, and the conical baffle 44 are constructed and arranged to operate substantially as described in connection with the form of the invention shown in Fig. 1. In the modification of Fig. 2, however, the horizontal baffle 43 is supported by 3 spaced rods 45 which extend upwardly from the base plug 46. A tiltable discharge casing 47 is mounted on the base plug 46 and includes a pressure tight top or cover 48 and a resilient check valve ring 49 arranged to close the port 50 formed in the wall of the member 47. The ring 49 operates substantially like the ring 26 of the Fig. 1 form of separator. The casing 47 is mounted to tilt about its fastening 51 by reason of the flexible resilient base 52. The member 52 constitutes a closure for the bottom of the tilting member 47, and is preferably formed of resilient material such as neoprene and has the lower edge of the casing 47 crimped therein as shown best in Fig. 4. A horeshoe shaped washer 53 is carried by the fastening member 51 anchored to the base plug 46 at the left-hand side of the member 52. The base plug 46 is provided with a discharge port 54 which port is adapted to be closed by the member 52 which overhangs the port 54. An opening 55 is provided in the member 52 adjacent the port 54 so that when air is discharged through the opening 55, it will tilt the member 52 and the casing carried thereby away from the port 54 so as to open the port 54.

The operation of the separator shown in Fig. 2 is similar to that described in connection with the form shown in Fig. 1 in that the inlet 41 is to be connected to an air supply such as a pressure tank and the outlet 42 is to be connected to the line 10 having the valve 12. The baffles 43 and 44 are arranged to cooperate with the tangential inlet so as to produce the double vortex or double cyclone separating flow.

With the valve 12 closed, it will be observed that the pressure within the casing 47 and the pressure in the separating casing 40 are the same, due to the admission of line pressure through the port 50 of casing 47. The opening of the valve 12 causes a pressure drop in the separating chamber so that there results a higher pressure existing within the casing 47 than in the separating chamber which surrounds it. The relatively higher pressure within the casing 47 causes the casing 47 to tilt bodily in a counter-clockwise direction with respect to its mounting on the base plug 46 as shown in dotted lines. This movement of the casing 47 may be understood by considering the casing 47 as though it were a container having the lower end thereof open and resting on the base 46. When a higher pressure exists in the container 47 than in the chamber surrounding the same, the reaction tends to lift the container 47 from the base. Since the opening 55 is at the right hand side of the container and the pivotal connection through the flexible member 52 is at the left hand side of the container, the container or casing 47 will merely tilt rather than be raised bodily by the pressure differential. As soon as the relatively higher pressure within the casing 47 is relieved through the opening 55 and approximates the pressure surrounding the casing 47, the casing 47 will tilt bodily in a clockwise direction by reason of the resilient mounting 51—52. Thereafter, while the valve 12 remains open, the pressures within the casing 47 and in the separating chamber surrounding it are substantially the same and the parts remain in the full line position as shown while centrifugal separation takes place and the oil, water and other foreign material accumulates in the lower section of the casing in the area indicated at 56. The opening of the port 54 leading to atmosphere by the tilting of the casing 47 results in the higher pressure blowing the accumulated foreign material out through the discharge port 54. It will be understood that the opening and closing of the port 54 as here described is a momentary thing and occurs automatically whenever the valve 12 is operated so as to cause pressure changes within the separator casing. I have found that separators made according to my invention are particularly well adapted for use in air lines leading to paint sprays, air hammers and air operated clutches which are characterized by frequent opening and closing of valves in the air lines.

Although I have shown and described two forms of my invention in considerable detail, it will be understood by those skilled in the art that numerous modifications may be made therein without departing from the scope of the invention as defined in the following claims.

What is claimed is:

1. A self-unloading gas separator comprising a generally cylindrical upright casing having a tapered top portion and a bottom wall, a tangential inlet in said tapered top portion, an outlet in said tapered top portion extending coaxially of the casing downwardly therein to a point below said tangential inlet, a pair of baffles supported within the casing from the bottom wall one of said baffles being a circular horizontally disposed imperforate plate and the other of said baffles being a conical section arranged above said plate, a discharge port in said bottom wall and means to periodically open and close said discharge port including a pressure responsive element, a port sealing member connected to said element, resilient means normally urging said sealing member into closing position with respect to said port, said pressure responsive element moving in a direction opposite to that effected by said resilient means in response to a pressure drop within said casing.

2. A cylindrical separator casing having an inlet and outlet at one end and a discharge port for separated materials at the other end, a discharge casing mounted within said separator casing spaced from the cylindrical walls thereof and adjacent said discharge port, a check valve for said discharge casing in a wall thereof to prevent fluid flow from said discharge casing into said separator casing, resilient means normally closing said discharge port operatively connected to said discharge casing whereby said resilient means is moved away from said discharge port upon a pressure drop in the separator casing with respect to the pressure within said discharge casing.

3. A separator for separating foreign material from a gas, comprising a casing constructed and arranged for centrifugal separation and a port in said casing for discharging foreign material separated and collected therein, means for opening said discharge port in response to a pressure drop within said casing comprising a cylindrical discharge casing arranged within said separator casing, said discharge casing having the bottom thereof secured to the bottom wall of the separator casing and over said discharge port, a check valve in said discharge casing to prevent fluid flow from said discharge casing into said separator casing, a top wall for said discharge casing, a sylphon bellows mounted on said top wall coaxially thereof, a valve rod connected to said sylphon bellows and extending downwardly through the discharge casing and into alignment with said discharge port, resilient means connected to said valve rod and normally urging the same into closed position over said discharge port when the same pressure exists within the discharge casing and the separator casing, said valve rod being moved away from said discharge port by the sylphon bellows in response to a pressure drop in the separator casing with respect to the pressure in the discharge casing.

4. A centrifugal separator comprising a casing having a discharge port in the bottom thereof for foreign materials separated within the casing, a cylindrical discharge casing having a smaller diameter than the inner diameter of the separator casing and being mounted within the separator casing for bodily movement toward and away from said discharge port, said discharge casing having a check valve in a wall thereof to prevent fluid flow outwardly therefrom into the separator casing, said discharge casing having an outlet at the bottom thereof effecting bodily movement of the casing away from said discharge port upon a pressure drop in the separator casing.

5. A cylindrical separator casing having an inlet and outlet at one end and a discharge port for separated materials at the other end, a discharge casing mounted within said separator casing, a check valve for said discharge casing to prevent fluid flow from said discharge casing into said separator casing when the pressure in the discharge casing exceeds the pressure in said separator casing, resilient means operatively connected to said discharge casing whereby said discharge port is opened upon a pressure drop in the separator casing with respect to the pressure within said discharge casing.

6. A separator for separating foreign material from a gas, comprising a casing constructed and arranged for centrifugal separation and a port in said casing for discharging foreign material collected therein, means for opening said discharge port in response to a pressure drop within said casing comprising a discharge casing within said separator casing and spaced from the wall of said first casing and being mounted for movement with respect to said port so as to open and close the port, a check valve in said discharge casing in a wall thereof to prevent fluid flow from said discharge casing into said separator casing, and means normally urging said discharge casing to closed position with respect said port.

7. A gas separator comprising an upright cylindrical casing, an inlet and outlet at the top end of said casing for gas, a bottom wall for the casing, a baffle supported by the bottom wall and spaced thereabove and cooperating with said inlet and outlet to effect centrifugal separation above said baffle, the periphery of the baffle being spaced from the inner wall of the casing whereby the space below said baffle receives the foreign materials separated above the baffle, means for automatically discharging said foreign materials from the casing comprising a discharge port in the bottom wall of the casing, a closure for said port having resilient means urging same to closing position over the port, and a bellows connected to the closure to move same in response to a pressure drop in the casing.

8. A centrifugal separator comprising a casing having a discharge port in the bottom thereof for foreign materials separated within the casing, a cylindrical discharge casing mounted within the separator casing over said discharge port, said discharge casing having a check valve in a wall thereof to prevent fluid flow outwardly therefrom into the separator casing, said check valve opening to admit fluid flow from the separator casing into the discharge casing through a wall thereof to balance the pressure in the two casings when the separator pressure exceeds the casing pressure, whereby said discharge port is opened to atmosphere by the discharge casing when the pressure in the discharge casing exceeds the pressure in the separator casing.

References Cited in the file of this patent

UNITED STATES PATENTS

| Number | Name | Date |
| --- | --- | --- |
| 381,150 | Lowden | Apr. 17, 1888 |
| 1,228,237 | Oleson | May 29, 1917 |
| 1,566,084 | Gardner et al. | Dec. 15, 1925 |
| 1,637,257 | Joiner | July 26, 1927 |
| 1,737,680 | Pinkham | Dec. 3, 1929 |
| 1,784,664 | Eickholt | Dec. 9, 1930 |
| 2,010,435 | Matheson | Aug. 6, 1935 |
| 2,058,189 | Stuard | Oct. 20, 1936 |
| 2,509,505 | Johnson | May 30, 1950 |